(12) United States Patent
Chen (10) Patent No.: US 12,323,191 B2
(45) Date of Patent: Jun. 3, 2025

(54) BEAMFORMING CHIP AND RADIO FREQUENCY SIGNAL CALIBRATION METHOD

(71) Applicant: Industrial Technology Research Institute, Hsinchu (TW)

(72) Inventor: Huan-Ta Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 65 days.

(21) Appl. No.: 18/519,054

(22) Filed: Nov. 26, 2023

(65) Prior Publication Data

US 2025/0141568 A1 May 1, 2025

(30) Foreign Application Priority Data

Oct. 27, 2023 (TW) ................ 112141169

(51) Int. Cl.
*H04B 17/12* (2015.01)
*H04B 7/0426* (2017.01)
*H04B 17/13* (2015.01)

(52) U.S. Cl.
CPC ............. *H04B 17/12* (2015.01); *H04B 7/043* (2013.01); *H04B 17/13* (2015.01)

(58) Field of Classification Search
CPC ........ H04B 17/10; H04B 17/11; H04B 17/12; H04B 17/13; H04B 17/14; H04B 17/15;
(Continued)

(56) References Cited

U.S. PATENT DOCUMENTS 7,392,015 B1 * 6/2008 Farlow ................... H04B 17/21
455/562.1
8,045,926 B2 * 10/2011 Martikkala .......... H04B 17/327
455/63.4
(Continued)

FOREIGN PATENT DOCUMENTS

CN 105940552 5/2019
CN 115812281 3/2023
(Continued)

OTHER PUBLICATIONS

"Office Action of Taiwan Counterpart Application", issued on Apr. 11, 2024, p. 1-p. 10.
(Continued)

*Primary Examiner* — James M Perez
(74) *Attorney, Agent, or Firm* — JCIPRNET (57) ABSTRACT

A beamforming chip and a radio frequency signal calibration method are provided. The beamforming chip includes a plurality of phase and gain controlling circuits and a calibration circuit. Each phase and gain controlling circuit is configured to change a phase and an amplitude of a received radio frequency input signal to generate a coupling signal. The calibration circuit is coupled to each phase and gain controlling circuit, and configured to select two of the coupling signals, wherein one is a first selected coupling signal before calibration and another one is a second selected coupling signal before calibration. The calibration takes the first selected coupling signal as a reference target to calibrate the phase and the amplitude gain of the second selected coupling signal until there are a minimum phase difference and a closest amplitude between the second selected coupling signal and the reference target.

15 Claims, 5 Drawing Sheets

(58) Field of Classification Search
CPC ........ H04B 17/16; H04B 17/19; H04B 17/20; H04B 17/201; H04B 17/204; H04B 17/21; H04B 17/22; H04B 17/221; H04B 7/02; H04B 7/04; H04B 7/0413; H04B 7/0426; H04B 7/043

See application file for complete search history.

(56) References Cited

U.S. PATENT DOCUMENTS

| | | | | |
|---|---|---|---|---|
| 8,111,646 | B1* | 2/2012 | Chang | H04J 14/08 375/232 |
| 8,811,461 | B1* | 8/2014 | Huynh | H04B 17/14 375/224 |
| 8,867,596 | B2* | 10/2014 | Su | H04B 17/21 375/295 |
| 9,031,163 | B2* | 5/2015 | Matsuo | H04L 1/0033 375/299 |
| 9,225,411 | B2* | 12/2015 | Matsuo | H01Q 1/246 |
| 9,294,177 | B2* | 3/2016 | Wang | H04B 7/0665 |
| 9,787,386 | B2* | 10/2017 | Strong | H04L 27/26 |
| 9,876,514 | B1* | 1/2018 | Corman | G06F 3/061 |
| 10,033,450 | B2* | 7/2018 | Strong | H04B 7/0682 |
| 10,090,940 | B2* | 10/2018 | O'Keeffe | H04B 17/11 |
| 10,355,764 | B2* | 7/2019 | Strong | H04B 7/0452 |
| 10,484,038 | B1* | 11/2019 | Kimball | H04B 17/12 |
| 10,680,725 | B1* | 6/2020 | Lu | H04B 17/12 |
| 10,707,942 | B2* | 7/2020 | Strong | H04B 7/0617 |
| 10,715,199 | B1* | 7/2020 | Kimball | H04B 7/0417 |
| 11,205,858 | B1* | 12/2021 | Durbin | H01Q 3/28 |
| 11,283,532 | B2* | 3/2022 | Lee | H04B 7/0465 |
| 12,057,892 | B2* | 8/2024 | Chervyakov | H04W 24/06 |
| 12,119,889 | B2* | 10/2024 | Park | H04B 17/0085 |
| 2010/0056083 | A1* | 3/2010 | Kim | H04B 7/06 455/115.1 |
| 2010/0093282 | A1* | 4/2010 | Martikkala | H04B 17/21 455/63.4 |
| 2010/0184392 | A1* | 7/2010 | Largey | H04B 17/21 455/39 |
| 2011/0043418 | A1* | 2/2011 | Teshirogi | H04B 17/327 343/703 |
| 2012/0213266 | A1* | 8/2012 | Su | H04B 17/21 375/226 |
| 2013/0107918 | A1* | 5/2013 | Tomisawa | H04B 17/15 375/219 |
| 2013/0235962 | A1* | 9/2013 | O'Keefe | H04B 17/12 375/371 |
| 2013/0308693 | A1* | 11/2013 | Li | H04W 24/02 375/224 |
| 2014/0192923 | A1* | 7/2014 | Matsuo | H01Q 3/28 375/296 |
| 2015/0124713 | A1* | 5/2015 | Salhov | H01Q 3/2605 370/329 |
| 2015/0139352 | A1* | 5/2015 | Matsuo | H04B 17/12 375/295 |
| 2015/0365126 | A1* | 12/2015 | Shimura | H04B 1/40 375/219 |
| 2016/0050569 | A1* | 2/2016 | Olgaard | H04W 24/02 370/252 |
| 2016/0072495 | A1* | 3/2016 | Shimura | G01R 25/005 327/236 |
| 2016/0191176 | A1* | 6/2016 | O'Keeffe | H04B 17/00 455/63.4 |
| 2016/0301484 | A1* | 10/2016 | Zhu | H04W 88/08 |
| 2016/0329631 | A1* | 11/2016 | Rheinfelder | H01Q 3/2605 |
| 2017/0117950 | A1* | 4/2017 | Strong | H04B 17/11 |
| 2017/0163357 | A1* | 6/2017 | Cordier | G06K 7/0095 |
| 2017/0234971 | A1* | 8/2017 | Arai | H04B 17/12 342/174 |
| 2018/0048373 | A1* | 2/2018 | Strong | H04B 17/11 |
| 2018/0262866 | A1* | 9/2018 | Haverinen | H04B 17/20 |
| 2018/0331745 | A1* | 11/2018 | Strong | H04B 17/11 |
| 2019/0334605 | A1* | 10/2019 | Strong | H04L 27/26 |
| 2020/0295816 | A1* | 9/2020 | Kang | H04B 7/086 |
| 2020/0373659 | A1* | 11/2020 | Hsu | H04B 17/21 |
| 2021/0159594 | A1* | 5/2021 | Tiebout | H01Q 5/385 |
| 2022/0078004 | A1* | 3/2022 | Li | G06F 1/06 |
| 2022/0173810 | A1* | 6/2022 | Chang | H04B 10/25759 |
| 2023/0095020 | A1* | 3/2023 | Wang | H04B 1/1607 370/329 |
| 2023/0361888 | A1* | 11/2023 | Park | H04B 17/221 |
| 2025/0055190 | A1* | 2/2025 | Chiang | H01Q 1/24 |

FOREIGN PATENT DOCUMENTS

| | | |
|---|---|---|
| TW | I416899 | 11/2013 |
| TW | I739181 | 9/2021 |
| TW | 202224363 | 6/2022 |

OTHER PUBLICATIONS

Jie Zhou et al., "High-Resolution Wideband Vector-Sum Digital Phase Shifter With On-Chip Phase Linearity Enhancement Technology", IEEE Transactions on Circuits and Systems—I: Regular Papers, Jun. 2021, pp. 2457-2469, vol. 68, No. 6.

Alfonso Tomás Muriel-Barrado et al., "Evaluation of a Planar Reconfigurable Phased Array Antenna Driven by a Multi-Channel Beamforming Module at Ka Band", IEEE Access, Apr. 22, 2021, pp. 63752-63766, vol. 9.

Ilker Kalyoncu et al., "A Phase-Calibration Method for Vector-Sum Phase Shifters Using a Self-Generated LUT", IEEE Transactions on Circuits and Systems—I: Regular Papers, Apr. 2019, pp. 1632-1642, vol. 66, No. 4.

Domenico Pepe et al., "Two mm-Wave Vector Modulator Active Phase Shifters With Novel IQ Generator in 28 nm FDSOI CMOS", IEEE Journal of Solid-State Circuits, Feb. 2017, pp. 344-356, vol. 52, No. 2.

Sbreyas Sen et al., "DSP Assisted Low Cost IQ Mismatch Measurement and Compensation Using Built in Power Detector", 2010 IEEE MTT-S International Microwave Symposium, May 23-28, 2010, pp. 336-339.

Ahmed Nafe et al., "An In-Situ Self-Test and Self-Calibration Technique Utilizing Antenna Mutual Coupling for 5G Multi-Beam TRX Phased Arrays", 2019 IEEE/MTT-S International Microwave Symposium, Jun. 2-7, 2019, pp. 1229-1232.

Martijn De Kok et al., "A 34- to 36-GHz Active Transmitarray for Ka-Band Tracking Radar Using 5G Tx/Rx Beamforming ICs: Design and 64-Element Demonstrator", IEEE Transactions on Antennas and Propagation, Apr. 2023, pp. 3260-3272, vol. 71, No. 4.

* cited by examiner

```
┌─────────────────────────────────────────────┐
│ Change a phase and an amplitude of a        │
│ received RF input signal through each phase │──S41
│ and gain control circuit to generate a      │
│ coupling signal                             │
└─────────────────────────────────────────────┘
                      │
┌─────────────────────────────────────────────┐
│ Select two of the coupling signals through  │
│ the calibration circuit, where one is a     │
│ first selected coupling signal before       │
│ calibration and another one is a second     │
│ selected coupling signal before calibration,│
│ and take the first selected coupling signal │──S42
│ as a reference target to calibrate a phase  │
│ and an amplitude gain of the second selected│
│ coupling signal until there are a minimum   │
│ phase difference and a closest amplitude    │
│ between the second selected coupling signal │
│ and the reference target                    │
└─────────────────────────────────────────────┘
```

BEAMFORMING CHIP AND RADIO FREQUENCY SIGNAL CALIBRATION METHOD

CROSS-REFERENCE TO RELATED APPLICATION

This application claims the priority benefit of Taiwan application serial no. 112141169, filed on Oct. 27, 2023. The entirety of the above-mentioned patent application is hereby incorporated by reference herein and made a part of this specification.

TECHNICAL FIELD

The disclosure relates to a chip and a method, and particularly relates to a beamforming chip and a radio frequency signal calibration method.

BACKGROUND

Viewing from a development trend of global low-orbit satellite communication technology, European and American manufacturers such as Starlink and Amazon have successively launched satellites to low orbit to establish low-orbit satellite ground communication equipment between transceivers on the ground and the low-orbit satellites. Given the development trend of global low-orbit satellite communication technology, international manufacturers such as ADI, AnokiWave, STMicro, Renesas, etc., further deploy to manufacture components such as antenna modules composed of radio frequency chips and patch antennas for the low-orbit satellite ground communication equipment.

SUMMARY

The disclosure is directed to a beamforming chip that is adapted to an antenna module and a radio frequency signal calibration method, such that the antenna module and the radio frequency signal calibration method can eliminate the need for use of an external input signal as a reference. The beamforming chip includes a plurality of phase and gain control circuits and a calibration circuit coupled to each of the phase and gain control circuits. Each phase and gain control circuit is configured to change a phase and an amplitude of a received radio frequency input signal to generate a coupling signal. The calibration circuit is configured to select two of the coupling signals, wherein one is a first selected coupling signal before calibration and another one is a second selected coupling signal before calibration, and takes the first selected coupling signal as a reference target to calibrate a phase and an amplitude gain of the second selected coupling signal until there are a minimum phase difference and a closest amplitude between the second selected coupling signal and the reference target.

The disclosure provides a radio frequency signal calibration method adapted to a beamforming chip including a plurality of phase and gain control circuits and a calibration circuit coupled to each of the phase and gain control circuits. The radio frequency signal calibration method includes: changing a phase and an amplitude of a received radio frequency signal by each of the phase and gain control circuits to generate a coupling signal; selecting two of the coupling signals by the calibration circuit, wherein one is a first selected coupling signal before calibration and another one is a second selected coupling signal before calibration, and taking the first selected coupling signal as a reference target to calibrate a phase and an amplitude gain of the second selected coupling signal until there are a minimum phase difference and a closest amplitude between the second selected coupling signal and the reference target.

Based on the above, the beamforming chip and the radio frequency signal calibration method of the disclosure may adaptively use internal signals to perform self-calibration without requiring an external signal as a reference.

DESCRIPTION OF THE EMBODIMENTS

Generally, an antenna module is formed by configured radio frequency (RF) chips and patch antennas on two opposite sides of a printed circuit board (PCB). Namely, 8×8 patch antennas are configured on a front side of the PCB and 4×4 RF chips are configured on a back side of the PCB, and each RF chip may generate 8 RF outputs to drive 4 patch antennas. When the patch antenna transmits or receives an RF signal, the RF chip may change an amplitude and a phase of the RF signal through a beamforming technology to generate the patch antenna with a highly directional beam.

Theoretically, as long as the radio frequency signal maintains a fixed phase difference and a same amplitude, the patch antenna may generate the maximum peak value of equivalent isotropically radiated power (EIRP). In fact, during a manufacturing process of the RF chips, the plurality of RF signals provided by the RF chips have different amplitudes and different phase differences, even the plurality of RF signals provided by the same RF chip also have different amplitude gains and different phase differences. This situation is what the industry calls process drift. For example, chip inspection includes pre-packaging chip probing test and post-packaging final test. Each RF signal of each remaining chip or even the same chip has a different amplitude and phase output.

Some calibration methods use external RF input signals to calibrate each of the RF signals with different phase differences and different amplitudes. For example, through a near-field measurement system, the RF signals with different phase differences and different amplitudes are calibrated until each RF signal may maintain consistent amplitude and phase difference.

Figure 1:
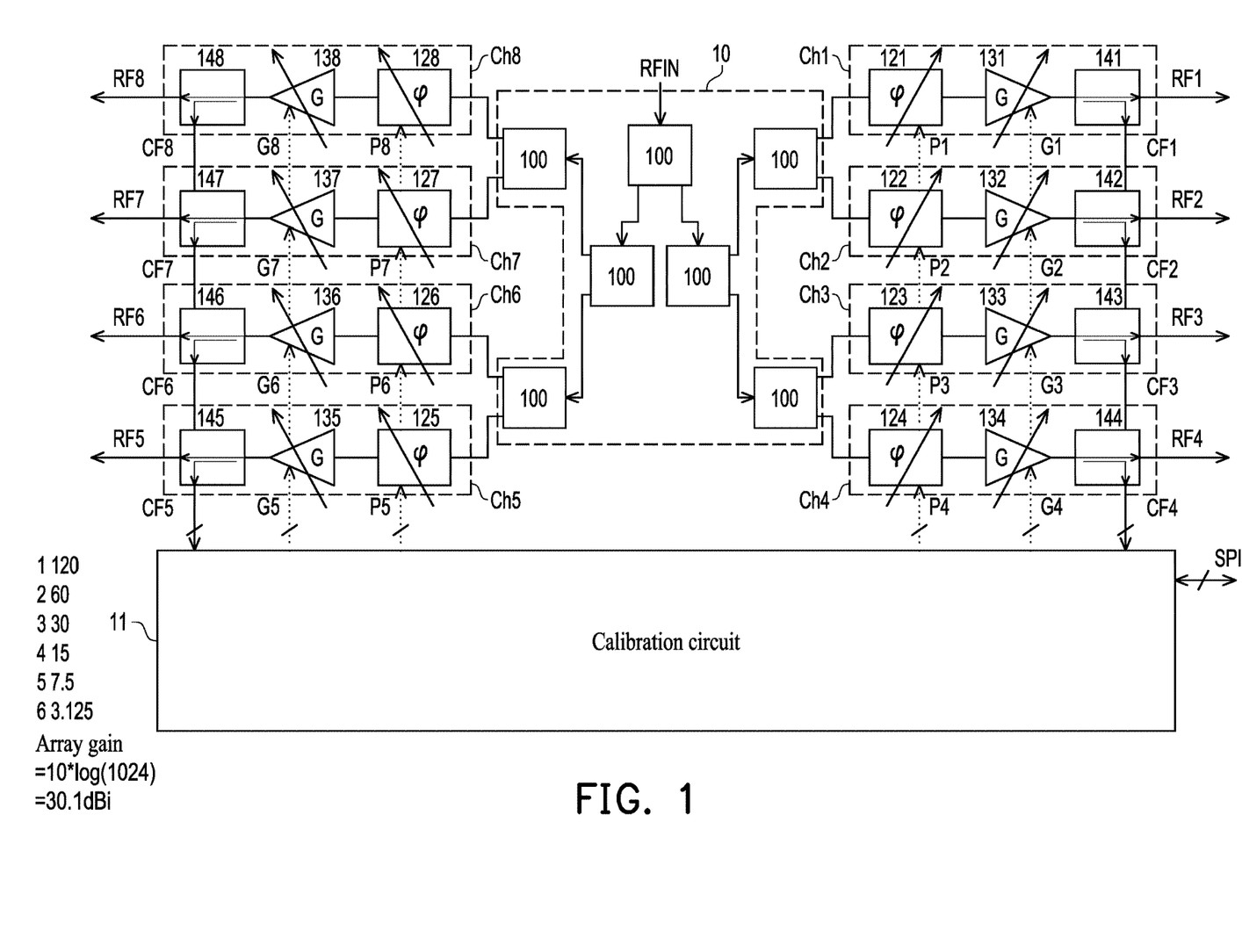
FIG. 1 is a circuit block diagram of a beamforming chip according to some embodiments of the disclosure.

FIG. 1 is a circuit block diagram of a beamforming chip 1 according to some embodiments of the disclosure. The beamforming chip 1 includes a power distribution circuit 10, phase and gain control circuits Ch1-Ch8, and a calibration circuit 11. After an RF input signal RFIN is input to the power distribution circuit 10, the RF input signal RFIN is provided to the phase and gain control circuits Ch1-Ch8 through a plurality of power splitters 100 in a binary tree-like series connection manner. Each of the phase and gain control circuits Ch1-Ch8 is used to generate a coupling signal by changing a phase and an amplitude of the received RF input signal under control of the calibration circuit 11. The calibration circuit 11 coupled to each of the phase and gain control circuits Ch1-Ch8, and is configured to select two of the coupling signals, where one is a first selected coupling signal before calibration and another one is a second selected coupling signal before calibration, and takes the first selected coupling signal as a reference target to calibrate a phase and an amplitude gain of the second selected coupling signal until there are a minimum phase difference and a closest amplitude between the second selected coupling signal and the reference target. Specifically, the beamforming chip 1 uses a beamforming technology to transmit RF output signals RF1-RF8, so that the calibration circuit 11 may control the phase and gain control circuits Ch1-Ch8 to align with phases and amplitudes of the RF output signals RF1-RF8, thereby improving transmission efficiency of the beamforming chip 1.

In some embodiments, instead of using an externally received reference target to calibrate the RF output signals RF1-RF8, the beamforming chip 1 selects to use one of the internally generated RF output signals RF1-RF8 as the reference target to calibrate other RF output signals, which may effectively reduce a demand and dependence on external systems, thereby increasing application flexibility of the beamforming chip 1.

In some embodiments, by disposing an antenna array on one side of a carrier board, such as a printed circuit board, and disposing the beamforming chip 1 as shown in FIG. 1 on the other side, the antenna array and the beamforming chip 1 may be integrated and applied on a same device.

In detail, the phase and gain control circuits Ch1-Ch8 may receive the RF input signal RFIN transmitted through the power distribution circuit 10. The phase and gain control circuits Ch1-Ch8 may receive the control of the calibration circuit 11, and adjust the phase and amplitude gain of the RF input signal RFIN to generate and send the RF output signals RF1-RF8, and at the same time, provide coupling signals CF1-CF8 with the same phase and amplitude as the RF output signals RF1-RF8 to the calibration circuit 11 for analysis. Each of the phase and gain control circuits Ch1-Ch8 has a phase adjustment circuit, an amplitude adjustment circuit and a coupler connected in series with each other. A plurality of phase adjustment circuits 121-128 may respectively receive phase adjustment signals P1-P8 provided by the calibration circuit 11, and adjust the phase of the RF input signal RFIN accordingly. A plurality of amplitude adjustment circuits 131-138 are coupled to the phase adjustment circuits 121-128, and may respectively receive amplitude adjustment signals G1-G8 provided by the calibration circuit 11 to adjust the amplitude gain of the RF input signal RFIN. A plurality of couplers 141-148 are coupled to the amplitude adjustment circuits 131-138, and may respectively output the signals output by the amplitude adjustment circuits 131-138, i.e., output the RF input signals RFIN subjected to phase and amplitude adjustments as the RF output signals RF1-RF8, and provide the coupling signals CF1-CF8 to the calibration circuit 11.

Specifically, the calibration circuit 11 may select two of the RF output signals RF1-RF8 as selected coupling signals for comparison. One of the selected coupling signals is used as the reference target, and the other one is used as a comparison signal. The calibration circuit 11 may adjust the comparison signal according to the reference target, which first adjusts a phase of the comparison signal (i.e., the second selected coupling signal) and then adjusts an amplitude gain of the comparison signal (i.e., the second selected coupling signal), so that the phase and the amplitude of the comparison signal may be aligned with the reference target, thus completing the calibration process of the comparison signal.

In some embodiments, the two selected coupling signals selected by the calibration circuit 11 from the coupling signals CF1-CF8 may be selected in a preset order. To be specific, after the calibration circuit 11 completes a first calibration process, the calibration circuit 11 may continue to select two of the coupling signals CF1-CF8 after calibrating the second selected coupling signal, where one is the calibrated second selected coupling signal and the other one is a third selected coupling signal before calibration, and takes the second selected coupling signal as the reference target to calibrate a phase and an amplitude gain of the third selected coupling signal until there are a minimum phase difference and a closest amplitude between the third selected coupling signal and the reference target. Deduced by analogy, after calibrating the third selected coupling signal, the calibration circuit 11 may sequentially select a current selected coupling signal before calibration from the coupling signals CF1-CF8, and use the calibrated selected coupling signal before the current selected coupling signal as the reference signal to select the smallest phase difference and close amplitude between the current selected coupling signal and the reference target, until there are the minimum phase difference and the closest amplitude between the last coupling signal before calibration selected from the coupling signals CF1-CF8 and the reference target. In this way, the calibration circuit 11 may sequentially select the selected coupling signals and repeat the calibration process, thereby completing the calibration of all RF output signals. For example, when the beamforming chip 1 is started, the calibration circuit 11 may select the RF output signals RF1 and RF2 from the RF output signals RF1-RF8 for calibration in the first calibration process. The calibration circuit 11 may set the RF output signal RF1 as a reference target and set the RF output signal RF2 as a comparison signal, and use the RF output signal RF1 as a reference to adjust the RF output signal RF2 to make the phase and amplitude of the RF output signal RF2 to be aligned with the RF output signal RF1. After the first calibration process is completed, the calibration circuit 11 may use the calibrated RF output signal RF2 as a reference target for a second calibration process, and then select the RF output signal RF3 from the uncalibrated RF output signals RF3-RF8 according to a numerical order to serve as the comparison signal, so as to calibrate the RF output signal RF3 according to the calibrated RF output signal RF2, and so on in subsequent operations.

In some other embodiments, the calibration circuit 11 may use one of the RF output signals RF1-RF8 to correct other RF output signals. For example, the calibration circuit 11 may use the RF output signal RF1 as the reference target in each calibration process, and compare it with the RF output signals RF2-RF8 in sequence, so that the phases and amplitudes of the RF output signals RF2-RF8 may all be aligned with the RF output signal RF1.

Figure 2:
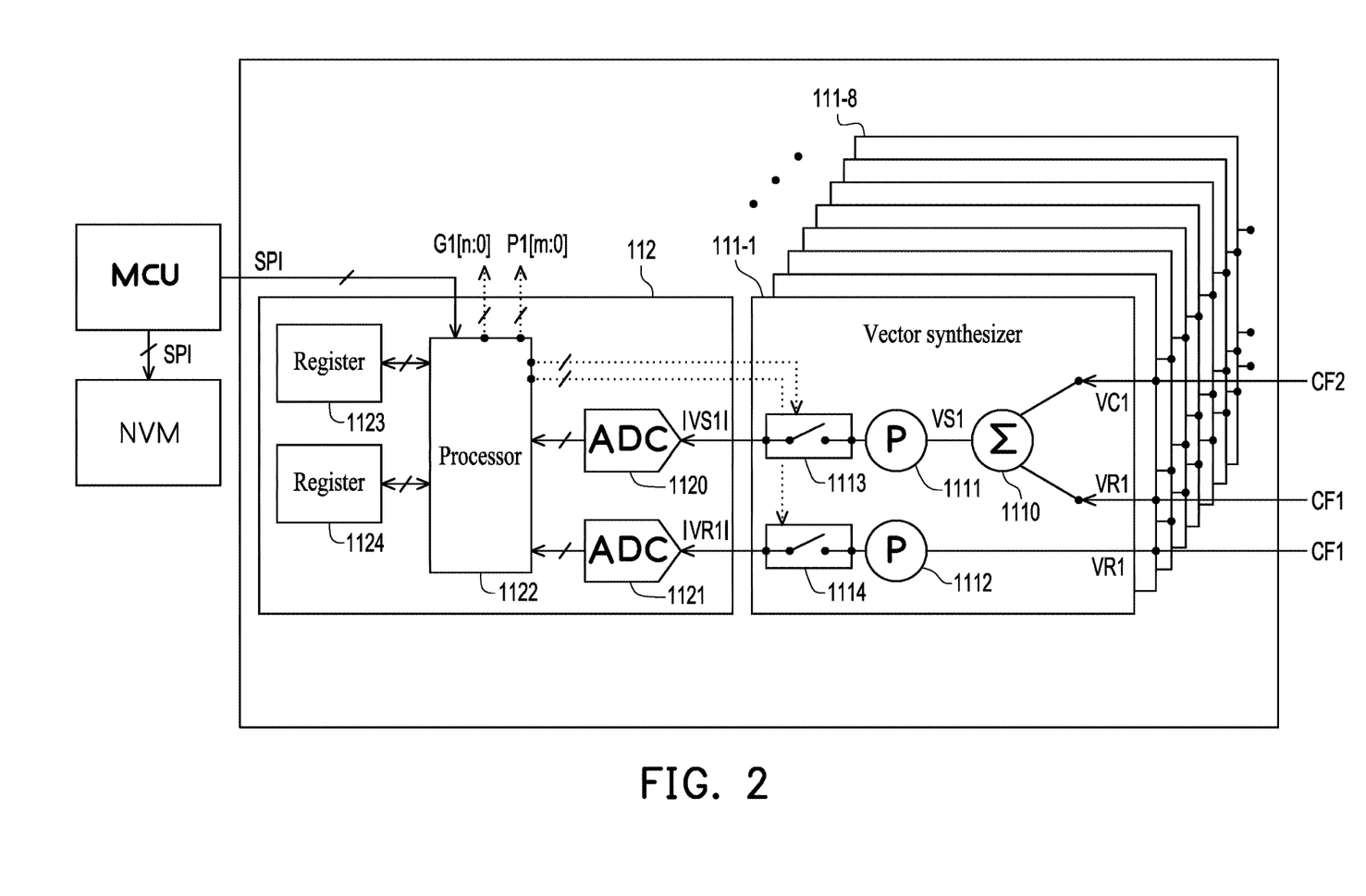
FIG. 2 is a circuit block diagram of a calibration circuit in FIG. 1.

FIG. 2 is a circuit block diagram of the calibration circuit 11 in FIG. 1. The calibration circuit 11 may select two of the coupling signals CF1-CF8 for comparison and calibration, so that the phases and amplitudes of the two selected coupling signals may be aligned. Generally, the calibration circuit 11 includes vector synthesizers 111-1 to 111-8 and a signal processing circuit 112. The vector synthesizers 111-1 to 111-8 may use the received selected coupling signals as comparison signals VC1-VC8 and reference targets VR1-VR8 to perform vector synthesis to respectively generate vector synthesized signals VS1-VS8. The vector synthesizers 111-1 to 111-8 may also provide amplitudes of the vector synthesized signals VS1-VS8 and the reference targets VR1-VR8 to the signal processing circuit 112, and the signal processing circuit 112 may adjust the phase adjustment signals P1-P8 and the amplitude adjustment signals G1-G8 provided to the phase and gain control circuits Ch1-Ch8 according to the amplitudes of the vector synthesized signals VS1-VS8 and the reference targets VR1-VR8. In some embodiments, the vector synthesizers 111-1 to 111-8 may be used to sum each candidate phase signal and the reference signal to generate a plurality of first synthesized vectors, and sum each candidate amplitude signal and the reference signal to produce a plurality of second synthesized vectors. The signal processing circuit 12 is coupled to the vector synthesizers. The signal processing circuit 12 is used to generate the candidate phase signals that follow each angle within a perigon and the candidate amplitude signals that follow each amplitude value within a predetermined amplitude range, and select the first synthesized vectors having the minimum phase difference with the reference target from the first synthesized vectors to serve as the phase adjustment signals, and select the second synthesized vectors with the closest amplitude to the reference target from the second synthesized vectors to serve as the amplitude adjustment signals. The content of the first synthesized vectors and the second synthesized vectors will be further explained in subsequent descriptions. In addition, although FIG. 2 only shows the signal coupling relationship and signal operation process that the vector synthesizer 111-1 uses the coupling signal CF1 as the reference target VR1 and the coupling signal CF2 as the comparison signal VC1, the signals received by the vector synthesizer 111-1 during the calibration process of other cycles, or the signals received by the other vector synthesizers 111-2 to 111-8 may also be deduced in the same way.

In detail, each vector synthesizer 111-1 to 111-8 includes a synthesis circuit 1110, amplitude information circuits 1111, 1112, and switches 1113, 1114. Taking the vector synthesizer 111-1 as an example, the vector synthesizer 111-1 receives the RF output signals RF1 and RF2, uses the RF output signal RF1 as the reference target VR1, and uses the RF output signal RF2 as the comparison signal VC1 to perform subsequent calibration. To be specific, the synthesis circuit 1110 sums the reference target VR1 and the comparison signal VC1 to generate the vector synthesized signal VS1. The amplitude information circuits 1111 and 1112 respectively receive the vector synthesized signal VS1 and the reference target VR1 to respectively obtain and output amplitude information of the vector synthesized signal VS1 and the reference target VR1. The switches 1113 and 1114 are controlled by the signal processing circuit 112 to provide the amplitude information of the vector synthesized signal VS1 and the reference target VR1 to the signal processing circuit 112 for calculation at an appropriate time.

The signal processing circuit 112 includes analog-to-digital converters (ADCs) 1120 and 1121, a processor 1122 and registers 1123 and 1124. Continuing from the example in the previous paragraph, the ADCs 1120 and 1121 may respectively receive the amplitude information of the vector synthesized signal VS1 and the reference target VR1 provided by the vector synthesizer 111-1, and convert the amplitude information into digital values for providing to the processor 1122. The processor 1122 may adjust the phase adjustment signal P1 and the amplitude adjustment signal G1 provided to the phase and gain control circuit Ch1 according to the amplitude information of the vector synthesized signal VS1 and the reference target VR1.

Specifically, the phase adjustment signals P1-P8 provided by the processor 1122 to each phase and gain control circuit may have m bits, and the amplitude adjustment signals G1-G8 may have n bits. In other words, accuracies of the phase adjustment circuits 121-128 and the amplitude adjustment circuits 131-138 of each of the signal emission paths Ch1-Ch8 may therefore be determined by the numbers of bits of the phase adjustment signals P1-P8 and the amplitude adjustment signals G1-G8. For example, each of the signal emission paths Ch1-Ch8 may have a minimum phase accuracy of 5.625 degrees and an amplitude gain accuracy of 0.5 dB, as well as a maximum adjustable phase of a perigon (i.e., 360 degrees) and a maximum adjustable amplitude gain of 15.5 dB. In addition, in order to make the adjustment of the overall beamforming chip 1 more accurate, the processor 1122 may compare and generate the phase adjustment signals P1-P8 with an accuracy of $2^{m+1}$ or higher, and compare and generate the amplitude adjustment signals G1-G8 with an accuracy of $2^{n+1}$ or higher.

Figure 3A:
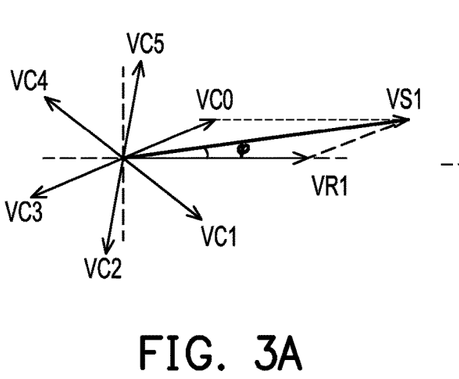
FIG. 3A is a schematic diagram of how a calibration circuit calibrates a phase of a comparison signal according to a reference target in some embodiments of the disclosure.

FIG. 3A is a schematic diagram of how the calibration circuit 11 calibrates a phase of a comparison signal according to a reference target in some embodiments of the disclosure. Referring to FIG. 2 and FIG. 3A to understand the process of calibrating the phases of the RF output signals RF1 and RF2 by the calibration circuit 11.

In the embodiment, the calibration circuit 11 may be used to generate a plurality of candidate phase signals following each angle within a perigon (i.e., 360 degrees), and synthesize the candidate phase signals with the reference target into a plurality of first synthesized vectors, and select the first synthesized vector with the smallest phase difference from the reference target to serve as the phase of the second selected coupling signal. To be specific, the processor 1122 may generate multiple sets of candidate phase adjustment signals and provide the same to the phase adjustment circuit 122 of the phase and gain control circuit Ch2 to generate a plurality of candidate phase signals VC0-VC5 with different phases. The vector synthesizer 111-1 may respectively sum up all of the candidate phase signals VC0-VC5 and the reference target VR1 (i.e., the RF output signal RF1) to generate a plurality of candidate phase synthesized signals (i.e., first synthesized signals). The candidate phase synthesized signals are processed by the amplitude information circuit 1111 and then provided to the signal processing circuit 112, and the processor 1122 of the signal processing circuit 112 selects the one with the largest amplitude from all of the candidate phase synthesized signals, and takes the corresponding candidate phase adjustment signal as the phase adjustment signal.

To be specific, for the ease of explanation, FIG. 3A only shows the candidate phase synthesized signal VS1 generated by summing the candidate phase signal VC0 and the reference target VR1, but other candidate phase signals VC1-VC5 may also be provided to the vector synthesizer 111-1 to perform summation and generate corresponding candidate phase synthesized signals, the processor 1122 may compare the amplitudes of all candidate phase synthesized signals to select one with the largest amplitude among all of the candidate phase synthesized signals.

In the example of FIG. 3A, the candidate phase synthesized signal VS1 generated by summing the candidate phase signal VC1 and the reference target VR1 has the largest amplitude, so that the processor 1122 may determine the candidate phase adjustment signal that generates the candidate phase signal VC1 as the selected phase adjustment signal, and provide the selected phase adjustment signal to the phase and gain control circuit Ch2 for subsequent calibration of the amplitude gain, and the processor 1122 thus completes the phase calibration of the RF output signal RF2.

Figure 3B:
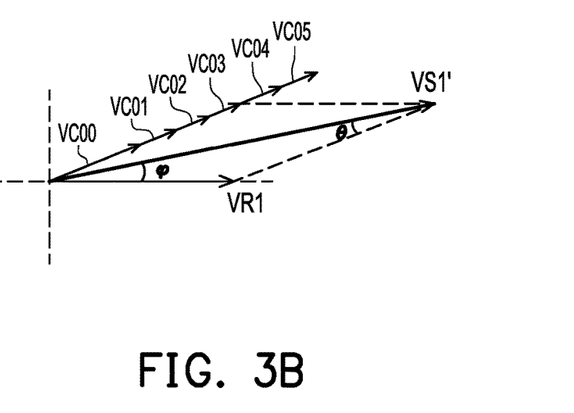
FIG. 3B is a schematic diagram of how the calibration circuit calibrates an amplitude gain of the comparison signal according to the reference target in some embodiments of the disclosure.

FIG. 3B is a schematic diagram of how the calibration circuit 11 calibrates an amplitude gain of a comparison signal according to a reference target in some embodiments of the disclosure. Referring to FIG. 2 and FIG. 3B together to understand the process of the calibration circuit 11 calibrating the amplitude gains of the RF output signals RF1 and RF2. Continuing with the example of FIG. 3A, after the processor 1122 determines the selected phase adjustment signal, the processor 1122 calibrates the amplitude gain of the RF output signal RF2.

In the embodiment, the calibration circuit 11 may be used to generate a plurality of candidate amplitude signals following each amplitude value within a predetermined amplitude range (for example, 0.5 dB to 15.5 dB), and synthesize the candidate amplitude signals and the reference target into a plurality of second synthesized vectors, and select the second synthesized vector with the closest amplitude as the amplitude of the second selected coupling signal. Specifically, the processor 1122 may generate multiple sets of candidate amplitude adjustment signals and provide the same to the amplitude adjustment circuit 132 of the phase and gain control circuit Ch2 to generate a plurality of candidate amplitude signals VC00-VC05 with different amplitudes. Since the candidate amplitude signals VC00-VC05 vary in amplitude based on the selected phase adjustment signals determined in FIG. 3A, the candidate amplitude signals VC00-VC05 may have the same phase as the candidate phase signal VC0. The vector synthesizer 111-1 may respectively sum up all of the candidate amplitude signals VC00-VC05 and the reference target VR1 (i.e., the RF output signal RF1) to generate the candidate amplitude synthesized signals (i.e., second synthesized signals). The amplitude information of all candidate amplitude synthesized signals and the reference target VR1 is processed by the amplitude information circuits 1111 and 1112 and then provided to the signal processing circuit 112, and the processor 1122 of the signal processing circuit 112 selects one of the candidate amplitude synthesized signals with the amplitude closest to twice of the amplitude of the reference target VR1, and takes the candidate amplitude signal corresponding to the selected candidate amplitude synthesized signal as the amplitude adjustment signal.

To be specific, as shown in FIG. 3B, under the phase of the candidate phase signal VC0, the candidate amplitude signals VC00-VC05 may be changed to different amplitudes according to the candidate amplitude adjustment signals. The processor 1122 may select the amplitude adjustment signal according to a following equation after comparing the amplitudes of all candidate amplitude synthesized signals with the amplitude of the reference target VR1.

$$|VS1'| = |VR1|\cos\varphi + |VC03|\cos\theta \cong 2|VR1|\cos\varphi$$

Where, $\varphi$ is an included angle between the candidate amplitude synthesized signal and the reference target VR1, and $\theta$ is an included angle between the candidate amplitude signals VC00-VC05 and the candidate amplitude synthesized signal. In detail, in the example, since the amplitude of the candidate amplitude synthesized signal generated by summing the candidate amplitude signal VC03 and the reference target VR1 may be close to twice of the candidate amplitude signal VC03 multiplied by a cosine of the angle $\varphi$ or $\theta$, the processor 1122 may use the above equation to select the candidate amplitude signal VC03 as the selected amplitude signal. Further, when the phases of the candidate amplitude signals VC00-VC05 are close to the reference target VR1, the angles $\varphi$ and $\theta$ may approach zero. Therefore, in some embodiments, the amplitude of the candidate amplitude synthesized signal VS1' determined by the processor 1122 may be close to twice of the candidate amplitude signal VC03.

Finally, the processor 1122 may store the information about the candidate phase adjustment signal or the selected phase adjustment signal in the register 1123, and may store the information about the candidate amplitude adjustment signal or the selected amplitude adjustment signal in the register 1124. Although separate registers 1123 and 1124 are shown in FIG. 2, in some embodiments, the registers 1123 and 1124 may also be integrated into a single register, and the processor 1122 may store the phase and amplitude information in different blocks of the single register.

Figure 4:
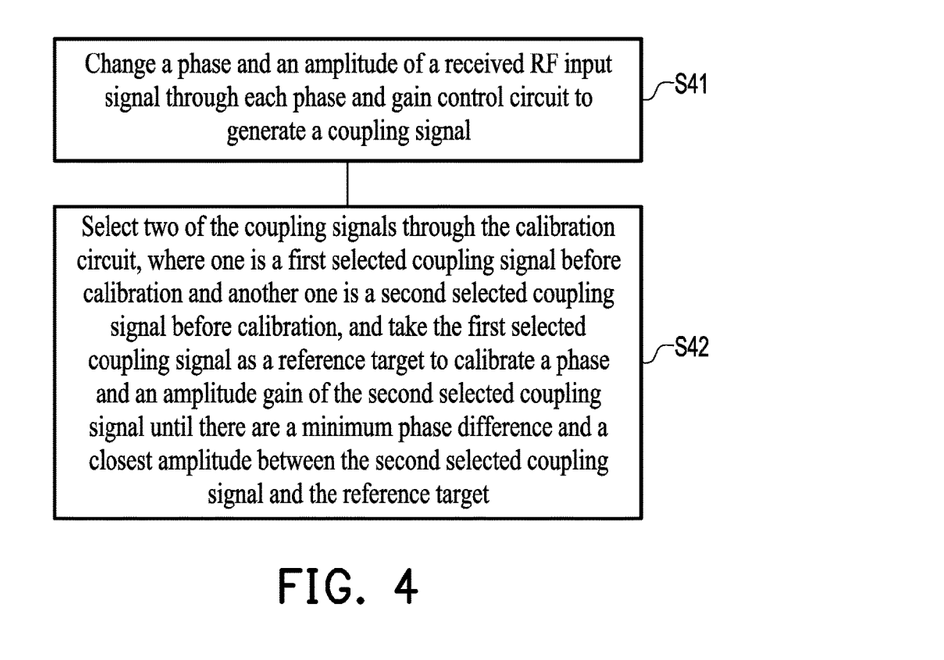
FIG. 4 is a flowchart of a RF output signal calibration method in some embodiments of the disclosure.

FIG. 4 is a flowchart of a RF output signal calibration method in some embodiments of the disclosure. The RF output signal calibration method of FIG. 4 may be applied to the beamforming chip 1 of FIG. 1. The RF output signal calibration method of FIG. 4 includes steps S41 and S42. In step S41, the beamforming chip 1 may change a phase and an amplitude of a received RF input signal through each phase and gain control circuit to generate a coupling signal. In step S42, the beamforming chip 1 may select two of the coupling signals through the calibration circuit 11, where one is a first selected coupling signal before calibration and another one is a second selected coupling signal before calibration, and take the first selected coupling signal as a reference target to calibrate a phase and an amplitude gain of the second selected coupling signal until there are a minimum phase difference and a closest amplitude between the second selected coupling signal and the reference target. In this way, by continuously repeating the above step S42, the beamforming chip 1 may complete calibration processes for all of the RF output signals RF1-RF8 without requiring an external signal as a reference.

Figure 5:
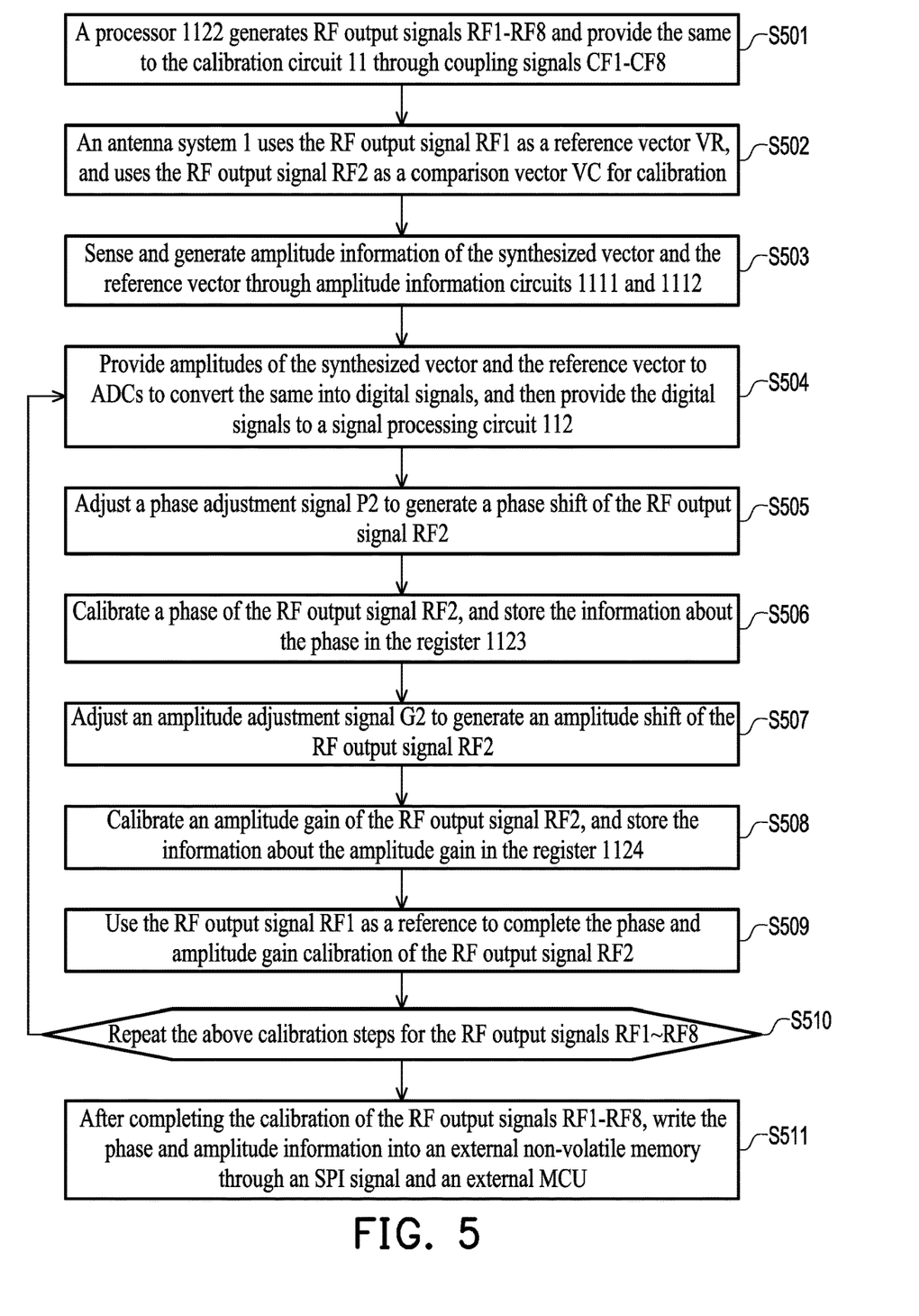
FIG. 5 a flowchart of a RF output signal calibration method in some embodiments of the disclosure.

FIG. 5 a flowchart of a RF output signal calibration method in some embodiments of the disclosure. The RF output signal calibration method of FIG. 5 may be applied to the beamforming chip 1 of FIG. 1. The RF output signal calibration method of FIG. 5 includes steps S501-S511. In step S501, the processor 1122 of the beamforming chip 1 may generate the RF output signals RF1-RF8 and provide the same to the calibration circuit 11 through the coupling signals CF1-CF8. In step S502, the beamforming chip 1 may use the RF output signal RF1 as the reference vector VR, and use the RF output signal RF2 as the comparison vector VC for calibration. In step S503, the beamforming chip 1 may sense and generate the amplitude information of the synthesized vector and the reference vector through the amplitude information circuits 1111 and 1112 (for example, power detectors). In step S504, the beamforming chip 1 may provide the amplitudes of the synthesized vector and the reference vector to the ADCs 1120 and 1121 to convert the same into digital signals, and then provide the digital signals to the signal processing circuit 112 for calculation. In step S505, the beamforming chip 1 may adjust the phase adjustment signal P2 to generate a phase shift of the RF output signal RF2. In step S506, the beamforming chip 1 may calibrate a phase of the RF output signal RF2 according to the RF output signal RF1, and store the information about the phase in the register 1123. In step S507, the beamforming chip 1 may adjust the amplitude adjustment signal G2 to generate an amplitude shift of the RF output signal RF2. In step S508, the beamforming chip 1 may calibrate an amplitude gain of the RF output signal RF2 according to the RF output signal RF1, and store the information about the amplitude gain in the register 1124. In step S509, the beamforming chip 1 uses the RF output signal RF1 as a reference to complete the phase and amplitude gain calibration of the RF output signal RF2. In step S510, the beamforming chip 1 may check whether the remained RF output signals RF3-RF8 have been calibrated, and if the check result is no, the beamforming chip 1 returns to step S504 and repeats the calibration step. When the check result is yes, step S511 is executed, and after completing the calibration of the RF output signals RF1-RF8, the processor 1122 may write the phase and amplitude information into an external non-volatile memory through an SPI signal and an external MCU for future transmission of the beamforming chip 1.

Figure 6A:
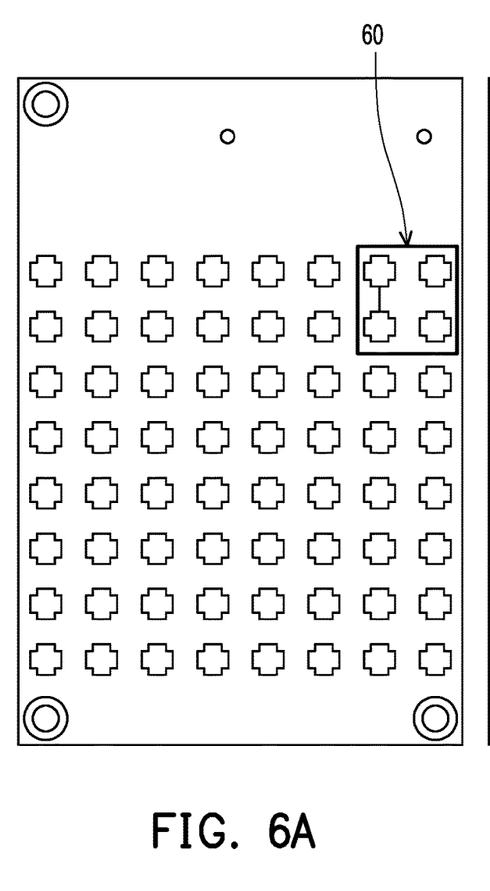
FIG. 6A and FIG. 6B are top and bottom views of an antenna module disposed on a printed circuit board according to an embodiment of the invention.
Figure 6B:
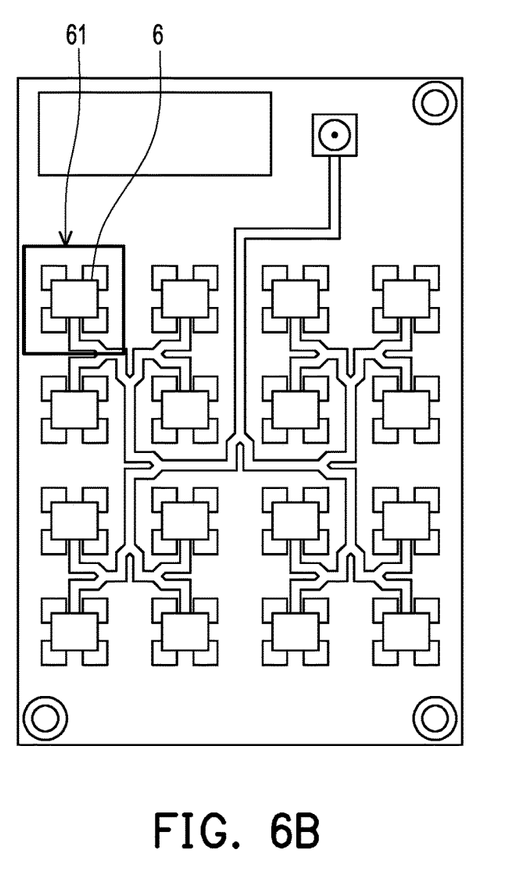

FIG. 6A and FIG. 6B are top and bottom views of an antenna module disposed on a printed circuit board according to an embodiment of the invention. Specifically, the antenna module is implemented by using a printed circuit board as a carrier board to dispose an antenna array on its front surface and beamforming chips 6 on its back surface. As shown in FIG. 6A and FIG. 6B, the printed circuit board is provided with an 8×8 antenna array of the antenna module on its front side, and is provided with a 4×4 beamforming chips 6 on its back side. More specifically, a block 60 shown in FIG. 6A corresponds to a block 61 shown in FIG. 6B. The block 60 includes four antennas arranged in an array on the front side of the printed circuit board and jointly coupled to the beamforming chip 6 in the block 61 on the back side. Specifically, after an RF input signal is provided to each beamforming chip 6 on the back side of the printed circuit board, an RF output signal is sent out through the antennas coupled to each beamforming chip 6. Furthermore, each beamforming chip 6 may perform adaptive calibration similar to that performed by the beamforming chip 1 in the above paragraph on the RF output signal it sends. In this way, the antenna module may send RF output signals with aligned or close phases and amplitudes without using the external clock signal for calibration, which effectively reduces the hardware cost and design complexity of antenna module wiring.

In summary, the beamforming chip and the RF signal calibration method of the disclosure may adaptively use internal signals to perform self-calibration without requiring an external signal as a reference, which effectively reduces the demand for external systems, thereby increasing the application flexibility of the beamforming chip.

What is claimed is:

1. A beamforming chip, comprising:
   a plurality of phase and gain control circuits, wherein each phase and gain control circuit is configured to change a phase and an amplitude of a received radio frequency input signal to generate a coupling signal; and
   a calibration circuit, coupled to each phase and gain control circuit, wherein the calibration circuit is configured to select two of the coupling signals, one is a first selected coupling signal before calibration and another one is a second selected coupling signal before calibration, and the calibration circuit takes the first selected coupling signal as a reference target to calibrate a phase and an amplitude gain of the second selected coupling signal until there are a minimum phase difference and a closest amplitude between the second selected coupling signal and the reference target.

2. The beamforming chip as claimed in claim 1, wherein after calibrating the second selected coupling signal, the calibration circuit continuously selects two of the coupling signals, one is the calibrated second selected coupling signal and another is a third selected coupling signal before calibration, and the calibration circuit takes the second selected coupling signal as the reference target to calibrate a phase and an amplitude gain of the third selected coupling signal until there are a minimum phase difference and a closest amplitude between the third selected coupling signal and the reference target.

3. The beamforming chip as claimed in claim 1, wherein after calibrating the third selected coupling signal, the calibration circuit sequentially selects a current selected coupling signal before calibration among the coupling signals, and takes a previous calibrated selected coupling signal before the current selected coupling signal as a reference signal to select a minimum phase difference and a close amplitude between the current selected coupling signal and the reference target until there are a minimum phase difference and a closest amplitude between a last coupling signal before calibration selected from the coupling signals and the reference target.

4. The beamforming chip as claimed in claim 1, wherein the calibration circuit is configured to generate a plurality of candidate phase signals following each angle within a perigon, and synthesizes the candidate phase signals and the reference target into a plurality of first synthesized vectors to select the first synthesized vector having a minimum phase difference with the reference target from the first synthesized vectors to serve as the phase of the second selected coupling signal.

5. The beamforming chip as claimed in claim 1, wherein the calibration circuit is configured to generate a plurality of candidate amplitude signals following each amplitude value within a predetermined amplitude range, and synthesizes the candidate amplitude signals and the reference target into a plurality of second synthesized vectors to select the second synthesized vector with the closest amplitude from the second synthesized vectors to serve as an amplitude of the second selected coupling signal.

6. The beamforming chip as claimed in claim 1, wherein when the calibration circuit calibrates the second selected coupling signal, the calibration circuit first calibrates the phase of the second selected coupling signal and then calibrates the amplitude gain of the second selected coupling signal through the phase and gain control circuit.

7. The beamforming chip as claimed in claim 1, wherein the calibration circuit provides a phase adjustment signal and an amplitude adjustment signal, and each phase and gain control circuit further comprises:
   a phase adjustment circuit, configured to adjust the phase of the radio frequency input signal according to the phase adjustment signal;
   an amplitude adjustment circuit, coupled to the phase adjustment circuit, wherein the amplitude adjustment circuit is configured to adjust an amplitude gain of the radio frequency input signal according to the amplitude adjustment signal; and a coupler, coupled to the amplitude adjustment circuit, wherein the coupler is configured to output the radio frequency input signal after adjustment of the phase and the amplitude as a radio frequency output signal, and provide the same to the calibration circuit.

8. The beamforming chip as claimed in claim 7, wherein the calibration circuit comprises:
a vector synthesizer, configured to sum each candidate phase signal and a reference signal to generate a plurality of first synthesized vectors, and sum each candidate amplitude signal and the reference signal to generate a plurality of second synthesized vectors; and
a signal processing circuit, coupled to the vector synthesizer, wherein the signal processing circuit is configured to generate the candidate phase signals following each angle within a perigon and the candidate amplitude signals following each amplitude value within a predetermined amplitude range, and select the first synthesized vector having a minimum phase difference with the reference target from the first synthesized vectors to serve as the phase adjustment signal, and select the second synthesized vector having a closest amplitude with the reference target from the second synthesized vectors to serve as the amplitude adjustment signal.

9. A radio frequency signal calibration method, adapted to a beamforming chip comprising a plurality of phase and gain control circuits and a calibration circuit coupled to the phase and gain control circuits, the radio frequency signal calibration method comprising:
changing a phase and an amplitude of a received radio frequency input signal by each phase and gain control circuit to generate a coupling signal;
selecting two of the coupling signals by the calibration circuit, wherein one is a first selected coupling signal before calibration and another one is a second selected coupling signal before calibration, and taking the first selected coupling signal as a reference target to calibrate a phase and an amplitude gain of the second selected coupling signal until there are a minimum phase difference and a closest amplitude between the second selected coupling signal and the reference target.

10. The radio frequency signal calibration method as claimed in claim 9, further comprising:
after calibrating the second selected coupling signal, continuously selecting two of the coupling signals, wherein one is the calibrated second selected coupling signal and another is a third selected coupling signal before calibration, and using the second selected coupling signal as the reference target to calibrate a phase and an amplitude gain of the third selected coupling signal until there are a minimum phase difference and a closest amplitude between the third selected coupling signal and the reference target.

11. The radio frequency signal calibration method as claimed in claim 9, further comprising:
after calibrating the third selected coupling signal, sequentially selecting a current selected coupling signal before calibration among the coupling signals, and taking a previous calibrated selected coupling signal before the current selected coupling signal as the reference target to select a minimum phase difference and a close amplitude between the current selected coupling signal and the reference target until there are a minimum phase difference and a closest amplitude between a last coupling signal before calibration selected from the coupling signals and the reference target.

12. The radio frequency signal calibration method as claimed in claim 9, wherein the step of selecting the second selected coupling signal having the minimum phase difference with the reference target comprises:
generating a plurality of candidate phase signals following each angle within a perigon by the calibration circuit, and summing each candidate phase signal and the reference target into a plurality of first synthesized vectors to select the first synthesized vector having a minimum phase difference with the reference target from the first synthesized vectors to serve as the phase of the second selected coupling signal.

13. The radio frequency signal calibration method as claimed in claim 9, wherein the step of selecting the second selected coupling signal having the closest amplitude with the reference target comprises:
generating a plurality of candidate amplitude signals following each amplitude value within a predetermined amplitude range by the calibration circuit, and synthesizing the candidate amplitude signals and the reference target into a plurality of second synthesized vectors to select the second synthesized vector with a closest amplitude from the second synthesized vectors to serve as an amplitude of the second selected coupling signal.

14. The radio frequency signal calibration method as claimed in claim 9, wherein the calibration circuit further comprises a vector synthesizer and a signal processing circuit, and the radio frequency signal calibration method further comprises:
summing each candidate phase signal and a reference signal to generate a plurality of first synthesized vectors by the vector synthesizer, and summing each candidate amplitude signal and the reference signal to generate a plurality of second synthesized vectors; and
generating the candidate phase signals following each angle within a perigon and the candidate amplitude signals following each amplitude value within a predetermined amplitude range by a signal processing circuit, and selecting the first synthesized vector having a minimum phase difference with the reference target from the first synthesized vectors to serve as the phase of the second selected coupling signal, and selecting the second synthesized vector having a closest amplitude with the reference target from the second synthesized vectors to serve as an amplitude of the second selected coupling signal.

15. The radio frequency signal calibration method as claimed in claim 9, wherein each phase and gain control circuit further comprises a phase adjustment circuit, an amplitude adjustment circuit, and a coupler, and the radio frequency signal calibration method further comprises:
providing a phase adjustment signal by the calibration circuit to make the phase adjustment circuit adjust the phase of the radio frequency input signal;
providing an amplitude adjustment signal by the calibration circuit to make the amplitude adjustment circuit adjust an amplitude gain of the radio frequency input signal; and
outputting the radio frequency input signal after adjustment of the phase and the amplitude as a radio frequency output signal by the coupler, and providing the same to the calibration circuit.

* * * * *